(12) United States Patent
Cheon et al.

(10) Patent No.: US 9,357,337 B2
(45) Date of Patent: May 31, 2016

(54) TERMINAL DEVICE AND METHOD FOR TRANSCEIVING DATA THEREOF

(71) Applicant: SAMSUNG ELECTRONICS CO., LTD., Suwon-si (KR)

(72) Inventors: Ka-won Cheon, Seoul (KR); Jae-uk Han, Osan-si (KR); Ji-su Jung, Goesan-gun (KR); Hyun-koo Kwak, Uiwang-si (KR); Sung-joon Park, Gumi-si (KR); Soo-hyun Jo, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 14/104,781

(22) Filed: Dec. 12, 2013

(65) Prior Publication Data

US 2014/0099898 A1    Apr. 10, 2014

Related U.S. Application Data

(63) Continuation of application No. 12/561,698, filed on Sep. 17, 2009, now Pat. No. 8,630,583.

(30) Foreign Application Priority Data

Dec. 11, 2008    (KR) .................. 10-2008-0125876

(51) Int. Cl.
*H04B 5/00*    (2006.01)
*H04W 4/00*    (2009.01)
(Continued)

(52) U.S. Cl.
CPC .............. *H04W 4/008* (2013.01); *G06F 3/017* (2013.01); *H04M 1/7253* (2013.01); *H04M 1/72558* (2013.01); *H04M 2250/12* (2013.01); *H04M 2250/64* (2013.01)

(58) Field of Classification Search
CPC .............. G06F 3/017; H04M 2250/12; H04M 2250/64
USPC .................... 455/39, 41.1, 41.2, 41.3, 73
See application file for complete search history.

(56) References Cited

U.S. PATENT DOCUMENTS

| 7,522,094 B1 | 4/2009 | Tu et al. |
| 7,724,705 B2 | 5/2010 | Erola et al. |

(Continued)

FOREIGN PATENT DOCUMENTS

| CN | 1836403 A | 9/2006 |
| CN | 1914865 A | 2/2007 |

(Continued)

OTHER PUBLICATIONS

Communication dated Mar. 5, 2013 issue by the Intellectual Property Office of the People's Republic of China in counterpart Chinese Patent Application No. 200910208335.1.

(Continued)

*Primary Examiner* — Ayodeji Ayotunde
(74) *Attorney, Agent, or Firm* — Sughrue Mion, PLLC

(57) ABSTRACT

A terminal device and a data transceiving method are provided. The terminal device includes a sensing unit which senses a momentum of the terminal device, an interface unit which receives a momentum from at least one external device, and a control unit which performs one of a data receiving operation, a data transmitting operation, and a data transceiving operation with the at least one external device depending on a comparison value obtained from a comparison of the sensed momentum with the received momentum to allow two devices to exchange data more easily.

12 Claims, 8 Drawing Sheets

(51) Int. Cl.
*G06F 3/01* (2006.01)
*H04B 7/00* (2006.01)
*H04B 1/38* (2015.01)
*H04M 1/725* (2006.01)

(56) References Cited

U.S. PATENT DOCUMENTS

| | | | |
|---|---|---|---|
| 8,165,523 B2 | 4/2012 | Makela et al. | |
| 8,630,583 B2 * | 1/2014 | Cheon et al. | 455/39 |
| 2004/0179545 A1 | 9/2004 | Erola et al. | |
| 2005/0198029 A1 | 9/2005 | Pohja et al. | |
| 2006/0092866 A1 | 5/2006 | Kim et al. | |
| 2007/0139373 A1 * | 6/2007 | Simon | G06F 1/1626 345/157 |
| 2007/0296696 A1 * | 12/2007 | Nurmi | G06F 3/017 345/158 |
| 2008/0039212 A1 | 2/2008 | Ahlgren et al. | |
| 2008/0108329 A1 | 5/2008 | Cho et al. | |
| 2008/0205354 A1 | 8/2008 | Makela et al. | |
| 2009/0063760 A1 | 3/2009 | Weddle | |
| 2009/0156131 A1 * | 6/2009 | Takasu | H04W 72/02 455/68 |
| 2010/0035632 A1 | 2/2010 | Catten | |

FOREIGN PATENT DOCUMENTS

| | | |
|---|---|---|
| KR | 2006081459 A | 7/2006 |
| WO | 2005/076542 A1 | 8/2005 |
| WO | 2008007175 A1 | 1/2008 |

OTHER PUBLICATIONS

Communication dated May 6, 2014, issued by the State Intellectual Property Office of the People's Republic of China in counterpart Chinese Application No. 200910208335.1.

Communication, Issued by the Korean Intellectual Property Office, Dated Aug. 27, 2014, in counterpart Korean Application No. 10-2008-0125876.

* cited by examiner

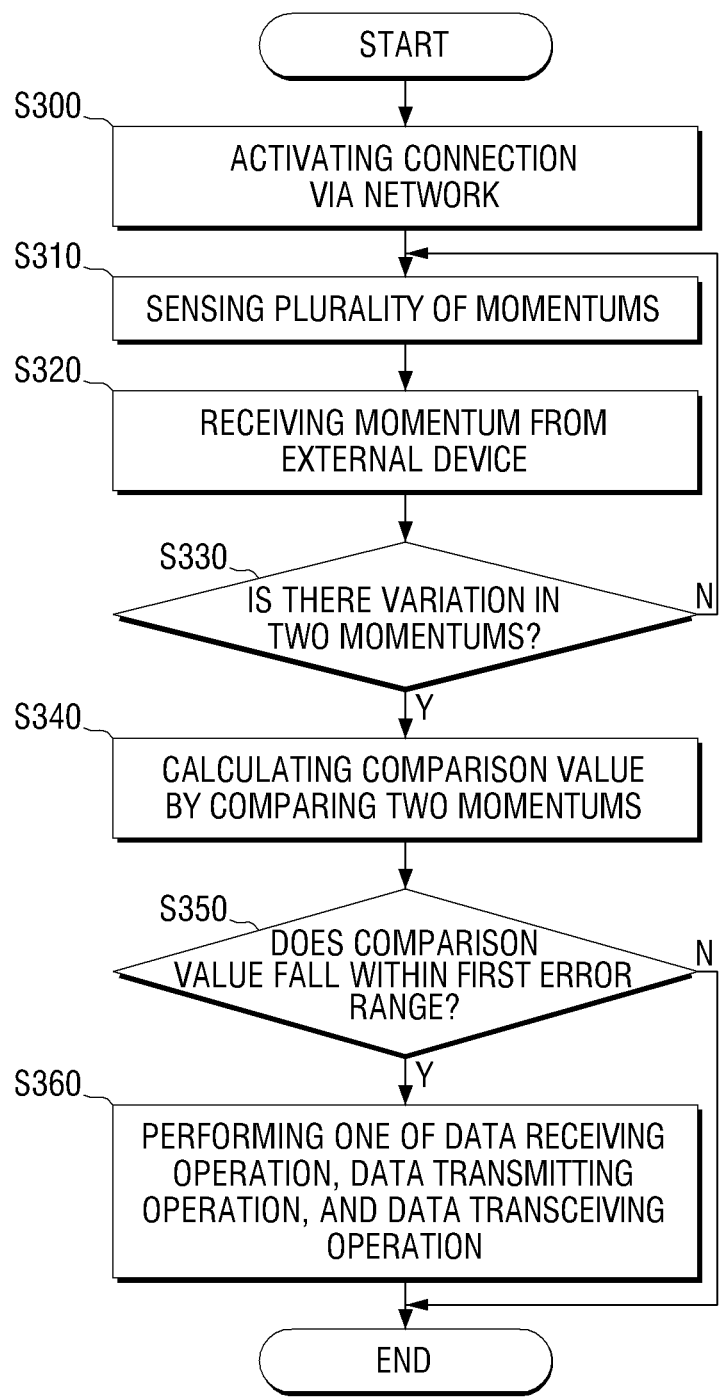

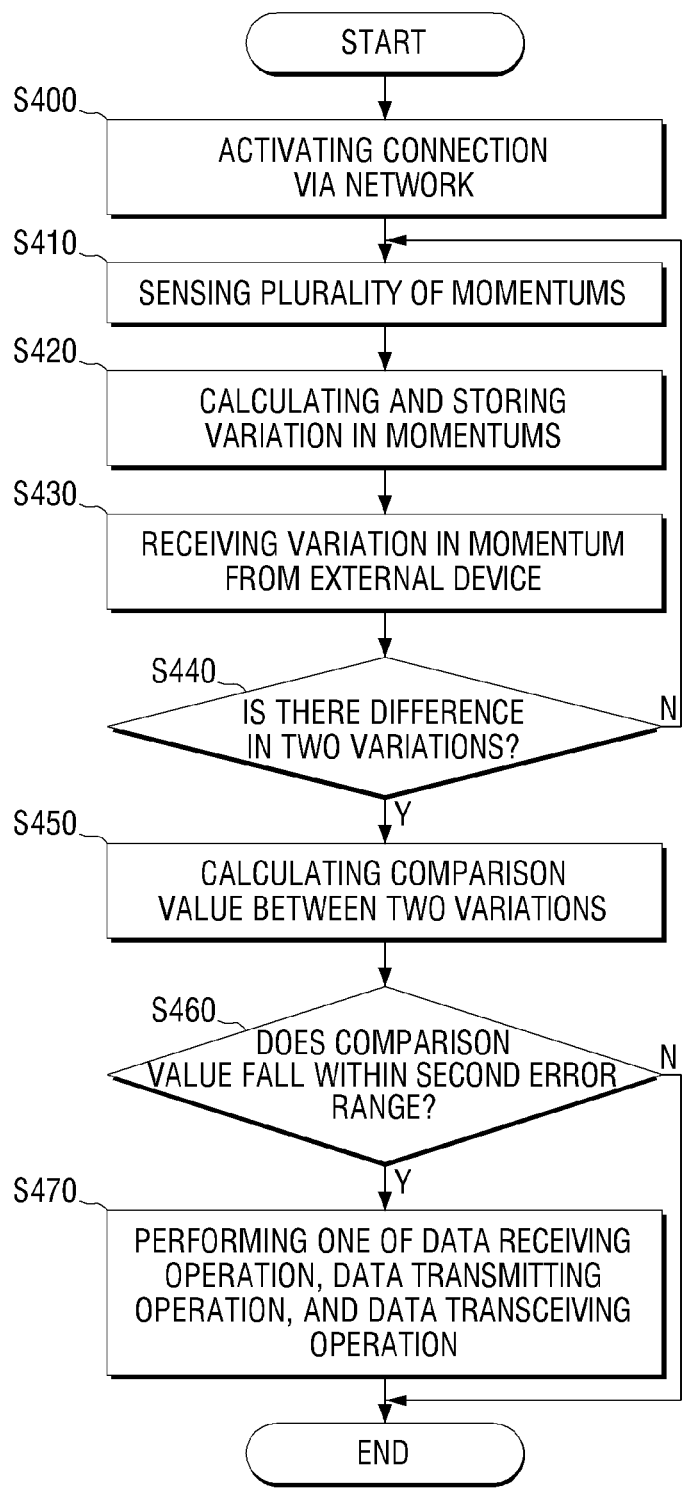

TERMINAL DEVICE AND METHOD FOR TRANSCEIVING DATA THEREOF

CROSS-REFERENCE TO RELATED APPLICATIONS

This application is a continuation of application Ser. No. 12/561,698, filed Sep. 17, 2009, which is based upon and claims priority from Korean Patent Application No. 10-2008-0125876, filed on Dec. 11, 2008, in the Korean Intellectual Property Office, the disclosure of which is incorporated herein by reference in its entirety.

BACKGROUND OF THE INVENTION

1. Field of the Invention

Methods and apparatuses consistent with the present invention relate to transceiving data, and more particularly, to transmitting data from and receiving data at a terminal device which shares data with an external device if the terminal device and the external device have the same momentum resulting from movements of the devices.

2. Description of the Related Art

In order to exchange data between two or more devices, a device needs to repeat operations of searching for a counter device, selecting data to be transmitted, and manipulating a transmission button several times.

More specifically, in order to transmit and receive (hereinafter "transceive") data between two or more devices, the devices are connected with each other via a data cable, and a program and a driver are required to synchronize the devices. When data is to be transmitted, it is selected from data, stored in the device, and a transmission button is pressed to transmit the data.

As described above, since a cable is required to connect the devices to transceive data between the devices, the data transmission cannot be performed if the cable is lost. In addition, it takes several minutes to install the program and the driver for synchronizing the devices.

Also, a user may not be familiar with a series of operations which are required to transmit data between a plurality of devices. In addition, the operations are manually performed. As a consequence, an extra learning process is required by the user to perform the required steps. Furthermore, since menus and manipulation methods are different for each device, it is difficult for a novice user to perform these operations.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for transceiving data and a terminal device which transceives data with an external device if the terminal device and the external device have the same momentum generated by a shaking movement.

According to an aspect of the present invention, a terminal device includes a sensing unit which senses a momentum, an interface unit which receives a momentum from at least one external device, and a control unit which performs one of a data receiving operation, a data transmitting operation, and a data transceiving operation with the at least one external device depending on a comparison value obtained from a comparison of the sensed momentum with the received momentum.

The sensing unit may sense the momentum of the terminal device in real time and output the momentum.

The sensing unit may include an acceleration sensor which measure an acceleration of the terminal device.

The interface unit may transmit the sensed momentum of the terminal device to the at least one external device.

The control unit may compare the sensed momentum of the terminal device with the momentum received from the at least one external device to calculate a comparison value, and, if the calculated comparison value falls within a first pre-set error range, the control unit may control the interface unit to perform one of the data receiving operation, the data transmitting operation, and the data transceiving operation.

The control unit may calculate a variation of the momentum of the terminal device sensed in real time by the sensing unit.

The interface unit may transmit the calculated variation of the momentum to the at least one external device and receive from the at least one external device a variation of a momentum measured in real time in the at least one external device.

The control unit may compare the calculated variation with the received variation to calculate a comparison value, and, if the comparison value falls within a second pre-set error range, the control unit may control the interface to perform one of the data receiving operation, the data transmitting operation, and the data transceiving operation.

The control unit may control the interface unit to activate a connection with the at least one external device via a network if the at least one external device is located in a communicable range.

If the data transceiving operation is to be performed, the control unit may control the terminal interface to receive data from the at least one external device which does not exist in the specific folder of the terminal device and to transmit data to the at least one external device which does not exist in the specific folder of the at least one external device.

According to another aspect of the present invention, a data transceiving method comprises sensing a momentum, receiving a momentum from the at least one external device, and performing one of a data receiving operation, a data transmitting operation, and a data transceiving operation with the at least one external device depending on a comparison value obtained from a comparison of the sensed momentum with the received momentum.

The sensing operation may sense the momentum of the terminal device in real time and output the momentum.

The sensing operation may sense the momentum using an acceleration sensor which measures an acceleration of the terminal device.

The data transceiving method may further comprise transmitting the sensed momentum of the terminal device to the at least one external device.

The performing one of the data receiving operation, the data transmitting operation, and the data transceiving operation may comprise comparing the sensed momentum of the terminal device with the momentum received from the at least one external device to calculate a comparison value, and performing one of the data receiving operation, the data transmitting operation, and the data transceiving operation if the calculated comparison value falls within a first pre-set error range.

The data transceiving method may further include calculating a variation of the momentums of the terminal device sensed in real time.

The data transceiving method may further include transmitting the calculated variation of the momentums of the terminal device to the at least one external device, and receiving from the at least one external device a variation of momentums measured in real time in the at least one external device.

The operation of performing one of the data receiving operation, the data transmitting operation, and the data transceiving operation may comprise comparing the calculated variation with the received variation to calculate a comparison value, and, if the comparison value falls within a second pre-set error range, performing one of the data receiving operation, the data transmitting operation, and the data transceiving operation.

The data transceiving method may further include activating a connection with the at least one external device via a network if the at least one external device is located in a communicable range.

If it is determined that the data transceiving operation is performed, one of a data receiving operation and a data transmitting operation are performed. The data transceiving operation includes receiving data from the at least one external device which does not exist in the specific folder of the terminal device and transmitting data to the at least one external device which does not exist in the specific folder of the at least one external device.

According to another aspect of the present invention, a terminal device comprises an interface unit which communicates with at least one external device located within a communicable range, and a control unit which controls the interface unit to perform one of a data receiving operation, a data transmitting operation, and a data transceiving operation with the at least one external device if the at least one external device is shaken along with the terminal device.

The terminal device may further include a storage unit which is provided with a specific folder, and a control unit which may perform one of the data receiving operation, the data transmitting operation, and the data transceiving operation such that, after performing the one of the data receiving operation, the data transmitting operation, and the data transceiving operation, data stored in the specific folder in the terminal device is the same as the data stored in a specific folder of the at least one external device.

The control unit may perform one of the data receiving operation, the data transmitting operation, and the data transceiving operation if shaking movements of the terminal device and the at least one external device satisfy a predetermined condition.

Additional aspects and advantages of the present invention will be set forth in the detailed description, will be obvious from the detailed description, or may be learned by practicing the invention.

BRIEF DESCRIPTION OF THE DRAWING FIGURES

The above and/or other aspects of the present invention will be more apparent by describing in detail exemplary embodiments thereof, with reference to the accompanying drawings in which:

FIG. 5 is a flowchart of a method for transceiving data according to an exemplary embodiment of the present invention; and FIG. 6 is a flowchart of a method for transceiving data according to another exemplary embodiment of the present invention.

DETAILED DESCRIPTION OF THE EXEMPLARY EMBODIMENTS

Figure 1:
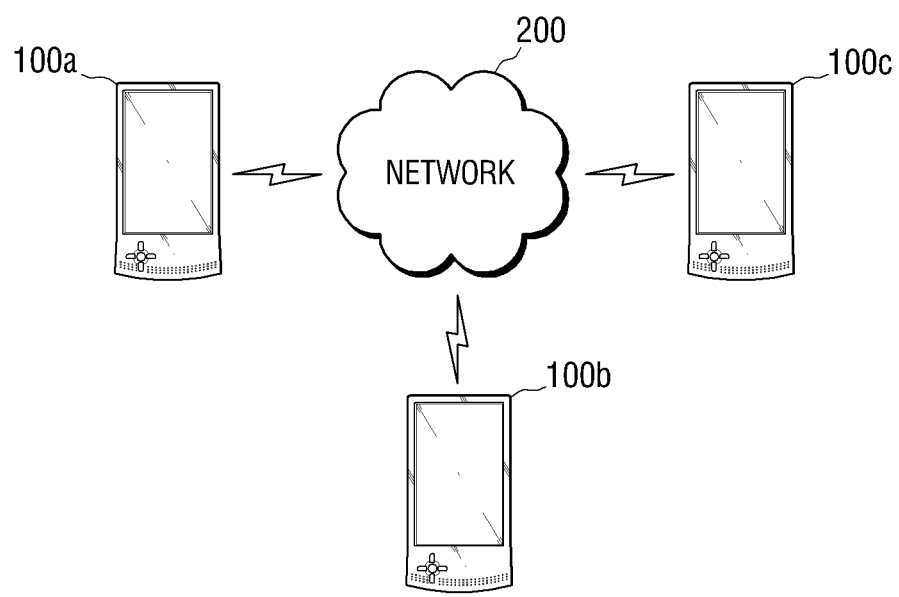
FIG. 1 is a diagram illustrating a data transceiving system according to an exemplary embodiment of the present invention.

Hereinafter, the present invention will be described in greater detail with reference to the accompanying drawings, in which exemplary embodiments are shown.

In the following description, same reference numerals are used for the same elements when they are depicted in different drawings. The matters defined in the description, such as detailed construction and elements, are provided to assist in a comprehensive understanding of the invention. Thus, it is apparent that the exemplary embodiments of the present invention can be carried out without those specifically defined matters. Also, functions or elements known in the related art are not described in detail since they would obscure the invention with unnecessary detail.

FIG. 1 is a diagram illustrating a data transceiving system according to an exemplary embodiment of the present invention.

As shown in FIG. 1, in the data transceiving system, a plurality of terminal devices are connected with each other via a network 200. Each of the plurality of terminal devices are capable of communicating with other devices, the other devices being external devices with respect to the terminal devices. Examples of terminal devices or external devices include mobile phones, personal digital assistants (PDAs), MP3 players, and laptop computers. The network 200 may be a wired or wireless network.

Each of the plurality of terminal devices is capable of communicating with another terminal device located within a communicable range via the network 200. For example, first, second and third terminal devices 100a, 100b and 100c are connected with each other via the network 200 and are located in a communicable range.

Each of the first, second and third terminal devices 100a, 100b and to 100c transmits its own momentum to another terminal device which is an external device with respect to the transmitting terminal device, and also receives the momentum of another device. For example, the first terminal device 100a transmits its own momentum to the second and the third terminal devices 100b, 100c in real time, and receives the momentum of the second terminal device 100b and the momentum of the third terminal device 100c in real time.

If two or more of the first, second and third terminal devices 100a, 100b and 100c are shaken so that they have the same momentum, a data transceiving operation is performed between the two or more terminal devices having the same momentum. In order for the two or more terminal devices to have the same momentum, users may shake the two or more terminal devices, holding them, for example, in one hand.

In FIG. 1, three terminal devices are connected with each other via the network 200. However, this should not be considered as limiting. For example, the number of terminal devices connected via the network 200 can be more or less than three.

The first, second and third terminal devices 100a, 100b and 100c perform the same functions. Respective components of the first, second and third terminal devices 100a, 100b and 100c will be described in detail with reference to FIG. 2.

Figure 2:
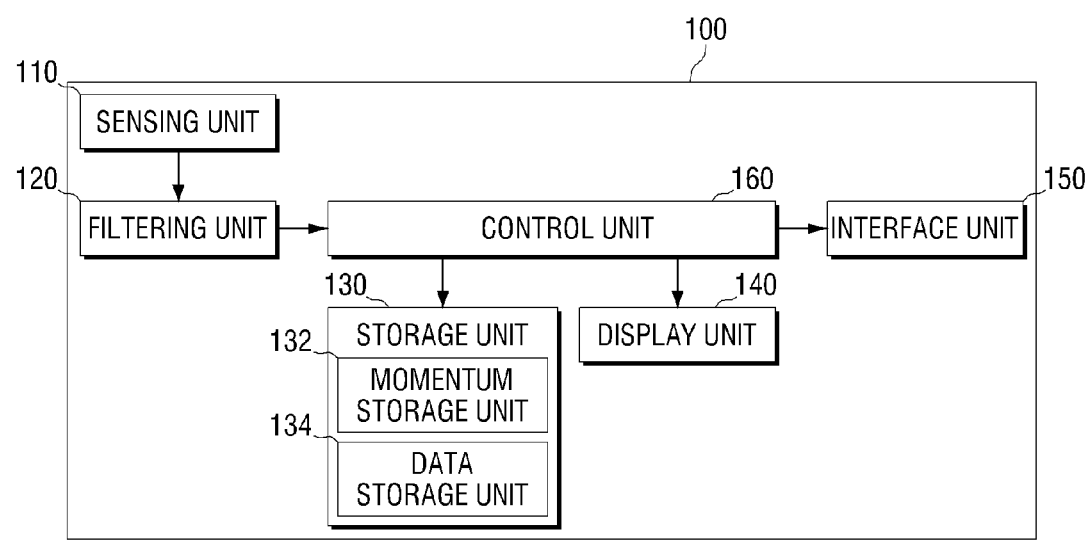
FIG. 2 is a block diagram illustrating a terminal device according to an exemplary embodiment of the present invention.

FIG. 2 is a block diagram showing a terminal device according to an exemplary embodiment of the present invention.

As shown in FIG. 2, a terminal device 100 comprises a sensing unit 110, a filtering unit 120, a storage unit 130, a display unit 140, an interface unit 150, and a control unit 160.

In this exemplary embodiment, one of the first, second and third terminal devices 100a, 100b and 100c is referred to as terminal device 100 and the other terminal devices, except for the terminal device 100, are referred to as external devices. In other words, if the first terminal device 100a corresponds to the terminal device 100 of FIG. 2, the second and the third terminal devices 100b and 100c are external devices with respect to the first terminal device 100a (100).

The sensing unit 110 senses, in real time, a momentum resulting from a movement of the terminal device 100. More specifically, if the terminal device 100 is stationary, the momentum sensed by the sensing unit 110 is 0, and if a motion is generated by shaking the terminal device 100, a corresponding momentum is sensed by the sensing unit 110.

The sensing unit 110 senses the momentum in real time, resulting in an output of a plurality of momentums. The sensing unit 110 may be an acceleration sensor to measure the acceleration of the terminal device.

The filtering unit 120 normalizes the momentum sensed by the sensing unit 110 in real time and outputs the momentum. The plurality of momentums output from the filtering unit 120 may be input to the control unit 160, which will be described later, and may be stored in the storage unit 130 under the control of the control unit 160.

The storage unit 130 comprises a momentum storage unit 132 and a data storage unit 134. The momentum storage unit 132 may store a plurality of momentums sensed by the sensing unit 110 and normalized by the filtering unit 120. Alternatively, if the control unit 160 compares adjacent momentums of the plurality of momentums arranged in the order measured, and calculates a variation in the momentum, the momentum storage unit 132 may store the calculated variation. Also, the momentum storage unit 132 may store the momentum of the external device received from the external device or a variation in the momentum received from the external device.

The data storage unit 134 may store various data, such as a music file and a motion picture file which are reproducible by the terminal device 100, and may organize the data in a plurality of folders.

The data storage unit 134 may comprise at least one folder to store the data, and one of the at least one folder is set to be a specific folder. The specific folder is a folder, defined by the user, to be used in the data transceiving operation with the external device. Data in the specific folder provided in the data storage unit 134 is exchanged with data of a specific folder of the external device when the terminal device performs data receiving operation, data transmitting operation, and data transceiving operation with the external device.

The storage unit 130 comprises the momentum storage unit 132 and the data storage unit 134 to store data according to the type of information to be stored. However, this should not be considered as limiting. Both the momentum and the data may be stored in a single storage unit 130.

The display unit 140 displays predetermined information under the control of the control unit 160. The display unit 140 displays data stored in the data storage unit 134 to allow the user to access the data stored in the terminal device 100. Also, the display unit 140 displays various data and folder information which are stored in the data storage unit 134.

The interface unit 150 provides the interface between the terminal device 100 and the network 200. That is, the terminal device 100 communicates with external devices via the interface unit 150.

The interface unit 150 may transmit the plurality of momentums of the terminal device 100 measured by the sensing unit 110 to the external devices because the external devices have the same configuration as the terminal device 100. In other words, the external devices compare their respective momentums with the momentum of the terminal device 100 or with momentums of other external devices to perform the data transceiving operation. Also, the interface unit 150 may receive the plurality of momentums transmitted from the respective external device.

That is, the terminal device 100 transmits the momentum sensed by the sensing unit 110 or a variation in the momentums to all external devices connected to the network 200 in real time and simultaneously receives the momentums or a variation in the momentums of all external devices connected to the network 200.

The control unit 160 controls all functions of the terminal device 100. That is, the control unit 160 controls signal input and output among the sensing unit 110, the filtering unit 120, the storage unit 130, the display unit 140, and the interface unit 150.

If an external device is located in the communicable range, the controller 160 controls the interface unit 150 to activate connection with the external device through the network 200. That is, if the terminal device 100 enters the communicable range, the terminal device 100 activates connection with the external device which is located in the current communicable range through the network 200, and if a new external device enters the communicable range of the terminal device 100, the terminal device 100 activates connection with the new external device through the network 200.

The control unit 160 compares the momentum sensed by the sensing unit 110 in real time with the momentum received through the interface unit 150 in real time, and performs a data receiving operation, a data transmitting operation or a data transceiving operation depending on the result of the comparison.

More specifically, the control unit 160 compares the sensed momentum of the terminal device 100 with the momentum received from the external device and determines if the momentum sensed by the sensing unit 110 satisfies a predetermined condition. The predetermined condition refers to a time during which the terminal device 100 is shaken or to conditions set for the momentum. If a slight motion is generated in the terminal device 100, which is stationary, the motion may not be determined as a motion to perform a data transceiving operation.

The control unit 160 compares adjacent momentums of a plurality of momentums arranged in the order measured to calculate a variation in the momentums. That is, the control unit 160 compares a current momentum with a previous momentum to calculate the variation. The control unit 160 also receives a variation of the momentums of the external device from the external device via the interface unit 150. The control unit 160 compares the calculated variation with the received variation and performs a data receiving operation, a data transmitting operation, or a data transceiving operation with the external device depending on the result of the comparison of the variations.

That is, the control unit 160 compares the momentum of the terminal device 100 with the momentum of the external device to perform a data receiving operation, a data transmitting operation, and a data transceiving operation or compares the variation in the momentums of the terminal device 100 with the variation in the momentums of the external device to perform a data receiving operation, a data transmitting operation, and a data transceiving operation.

When the control unit 160 only compares two momentums, it does not have to calculate the variation of the momentums and can increase its capacity to transceive data. When the control unit 160 has to further perform calculating and comparing variations, it may have to reduce the capacity to transceive data.

In controlling the data transceiving operation, the control unit 160 compares the momentum sensed by the sensing unit 110 with the momentum of the external device to calculate a comparison value, and determines whether to perform the data transceiving operation depending on whether the comparison value falls within a first error range.

If the comparison value falls within the first error range, the control unit 160 controls the interface unit 150 to perform the data transceiving operation between the terminal device 100 and the external device which has transmitted the corresponding momentum, and if the comparison value does not fall within the first error range, the control unit 160 controls the interface unit 150 not to perform the data transceiving operation.

In controlling the data transceiving operation, the control unit 160 may calculate a variation in the momentums sensed by the sensing unit 110 and store the variation in the storage unit 130. Then, the control unit 160 compares the calculated variation with a variation in the momentums of the external device to calculate a comparison value of the variations, and determines whether to perform the data transceiving operation depending on whether the calculated comparison value of the variations falls within a second error range.

If the comparison value of the variations falls within the second error range, the control unit 160 controls the interface unit 150 to perform the data transceiving operation between the terminal device 100 and the external device which has transmitted the corresponding variation, and if the comparison value does not fall within the second error range, the control unit 160 controls the interface unit 150 not to perform the data transceiving operation.

As described above, the control unit 160 compares the momentum of the terminal device 100 or a variation in the momentums with the momentum of the external device or a variation in the momentums of the external device, and determines whether to perform a data transceiving operation depending on whether the comparison value falls within a predetermined error range. That is, the data transceiving operation is performed among the terminal device 100 and the external device if the terminal device 100 and the external device have the same momentum. For example, if momentums are gained by the motion of shaking the terminal device 100 and the external device with the user's hand and the momentums are similar to the extent by which the comparison value falls within an allowable error range in consideration of a small error, the two momentums are determined to be the same.

If it is determined that a data transceiving operation is to be performed between the terminal device 100 and the external device, the control unit 160 compares a specific folder of the terminal device 100 with a specific folder of the external device, and receives data from the external device which does not exist in the specific folder of the terminal device 100 and transmits data to the external device which does not exist in the external device.

Prior to controlling the data receiving operation, the data transmitting operation, and the data transceiving operation, the control unit 160 may output a message on the display unit 140 to request the user to decide whether to perform the data receiving operation, the data transmitting operation, and the data transceiving operation. If the user selects one of the data receiving operation, the data transmitting operation, and the data transceiving operation in response to the message, the control unit 160 controls the interface unit 150 to perform the selected operation based on the user's input.

The terminal device 100 may receive data from the external device or transmit data to the external device, or the terminal device 100 and the external device may transceive data from each other.

For example, if all files which are stored in the specific folder of the terminal device 100 exist in the specific folder of the external device but a file which is not stored in the specific folder of the terminal device 100 exists in the specific folder of the external device, the control unit 160 receives the file which is not stored in the specific folder of the terminal device 100 from the specific folder of the external device via the interface unit 150.

Also, if all files which are stored in the specific folder of the external device exist in the specific folder of the terminal device 100 but a file which is not stored in the specific folder of the external device exists in the specific folder of the terminal device 100, the control unit 160 transmits the file which is not stored in the specific folder of the external device from the specific folder of the terminal device 100 to the external device via the interface unit 150.

Also, if there is a difference between the file stored in the specific folder of the terminal device 100 and the file stored in the specific folder of the external device, the control unit 160 transmits the file which is stored in the specific folder of the terminal device 100 but not stored in the specific folder of the external device to the external device through the interface unit 150, and receives the file which is stored in the specific folder of the external device but not stored in the specific folder of the terminal device 100 via the interface unit 150.

The terminal device with the above configuration may be one of the first, second and third terminal devices. That is, each of the first, second and third terminal devices include all of the components of FIG. 2 and may further comprise an infrared data association (IrDA) block for infrared communication (not shown) in addition to the sensing unit 110, the filtering unit 120, the storage unit 130, the display unit 140, the interface unit 150, and the control unit 160 shown in FIG. 2.

However, other components except for the sensing unit 110, the filtering unit 120, the storage unit 130, the display unit 140, the interface unit 150, and the control unit 160 are not essential to realize the present invention and thus detailed description thereof is omitted.

Figure 3A:
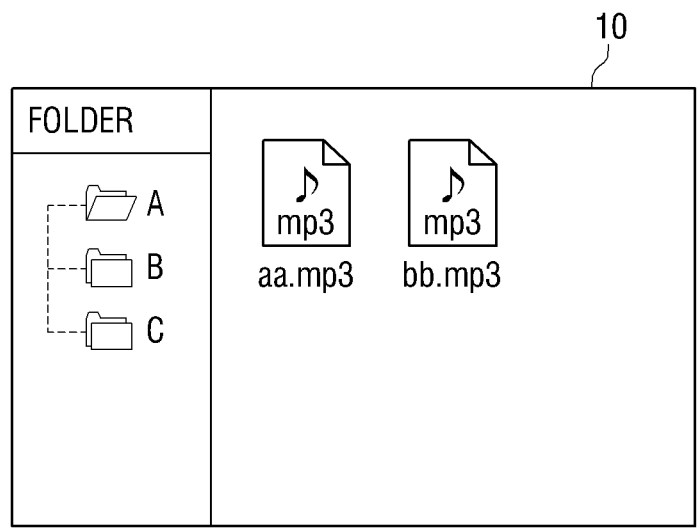
FIGS. 3A to 3D are views illustrating an example of a screen of a terminal device when the terminal device performs a data transceiving operation.

FIGS. 3A to 3D are views illustrating an example of a screen of the terminal device 100 when the terminal device 100 performs a data transceiving operation;

FIG. 3A illustrate a data structure displayed on a display screen (10) displayed by the display unit 140 of the terminal device 100. Referring to the display screen (10), the terminal device 100 has folders 'A', 'B', 'C' and the folder 'A' contains files 'aa.mp3' and 'bb.mp3'.

Figure 3B:
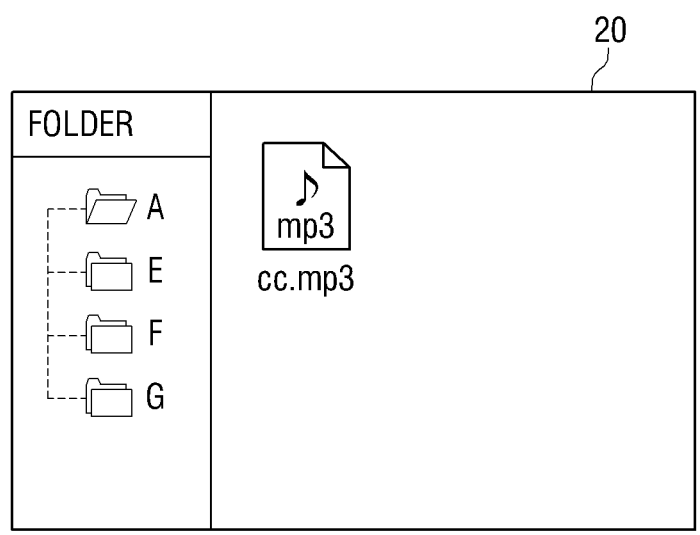

FIG. 3B illustrates a data structure displayed on a display screen (20) of the external device which is determined to perform a data transceiving operation with the terminal device 100. Referring to the display screen (20) of the external device, the external device has folders 'A', 'E', 'F', 'G' and the folder 'A' contains file 'cc.mp3'.

The terminal device 100 and the external device exchange their respective momentum or variation in the momentums in real time, and if the user shakes the terminal device 100 and the external device in one of her/his hand, the data transceiving operation is performed between the terminal device 100 and the external device.

After the data transceiving operation has been performed between the terminal device 100 and the external device, initiated by the shaking movement, the terminal device 100 and the external device share the same data.

Figure 3C:
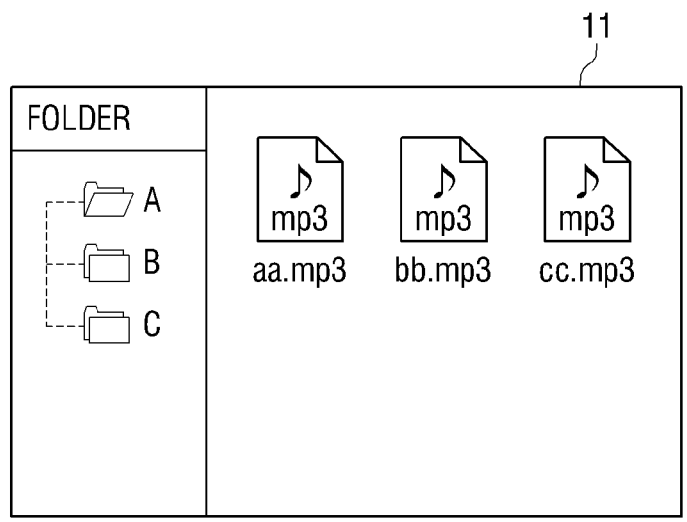

FIG. 3C illustrate a screen display (11) of the terminal device 100 after the data transceiving operation is performed between the terminal device 100 and the external device. Before the data transceiving operation, the folder 'A' contains only files 'aa.mp3' and 'bb.mp3'. After the data transceiving operation, the folder 'A' contains the file 'cc.mp3' in addition to the files 'aa.mp3' and 'bb.mp3'.

Figure 3D:
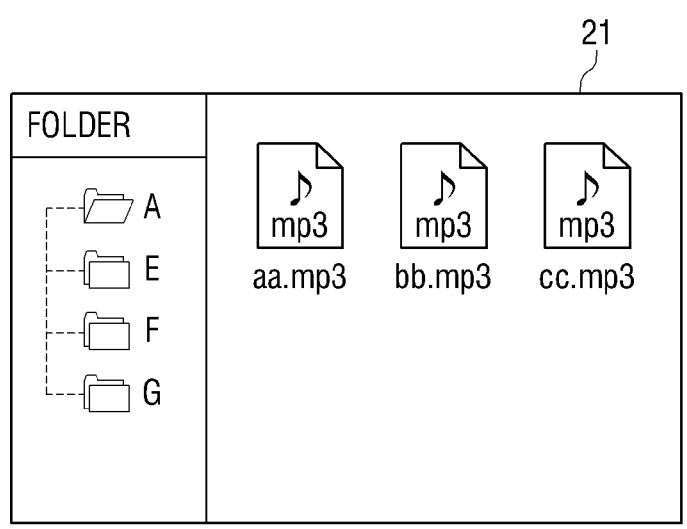

FIG. 3D illustrates a display screen (21) of the external device after the data transceiving operation is performed between the external device and the terminal device 100. Before the data transceiving operation, the folder 'A' contains only the file 'cc.mp3'. After the data transceiving operation, the folder 'A' contains files 'aa.mp3' and 'bb.mp3' in addition to the file 'cc.mp3'.

As a result, if the user shakes the terminal device 100 and the external device with his/her hand, data transceiving operation is performed between the terminal device 100 and the external device. However, the terminal device 100 and the external device may contain a further file or files which are not stored in one device, but are stored in the respective counter device.

In the exemplary embodiment, the terminal device 100 and the external device have a folder with a same name (folder 'A') for example. However, this should not be considered as limiting. The folder A is merely designated as a folder used to perform the data transceiving operation between the terminal device 100 and the external device, and it is not necessary to use the same folder name.

In the exemplary embodiment, data transceiving operation is performed between two of a plurality of terminal devices. However, this is merely an example of the exemplary embodiment. The number of terminal devices to perform data transceiving operation is not limited to two. That is, two or more terminal devices may perform data transceiving operation simultaneously.

Figure 4A:
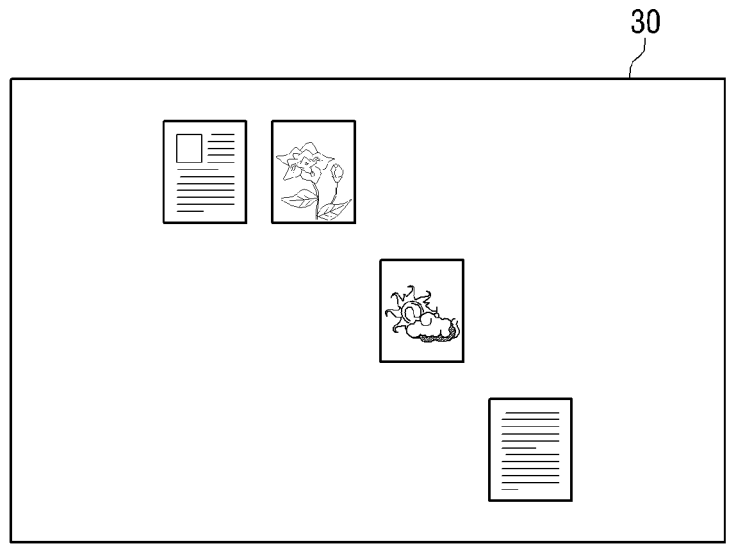
FIGS. 4A to 4C are views illustrating another example of a screen of a terminal device when the terminal device performs a data transceiving operation.
Figure 4B:
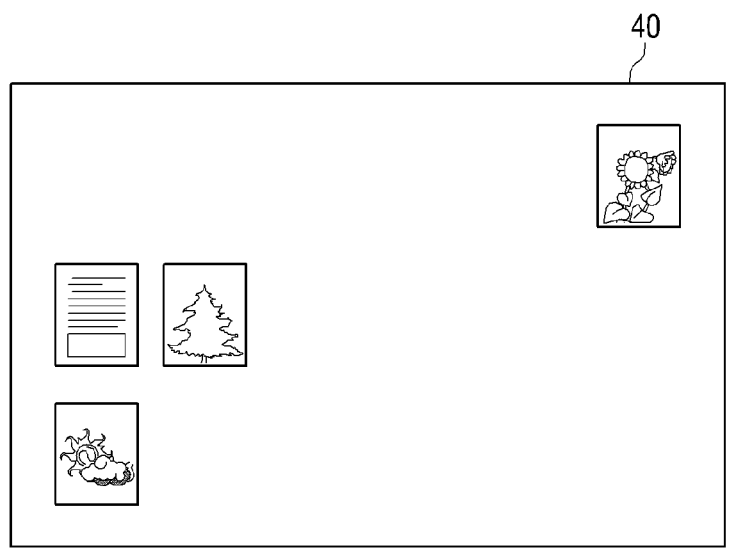
Figure 4C:
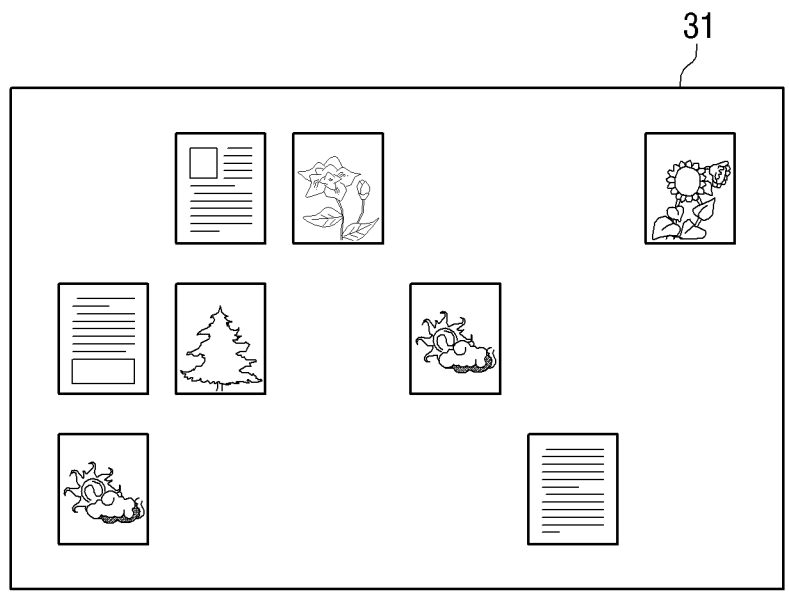

FIGS. 4A to 4C are views illustrating another example of a screen of the terminal device when the terminal device performs a data transceiving operation.

In this example, post-it data created by an application program (post-it program) is exchanged between the terminal device 100 and the external device. By using the post-it program, which is an implementation of a post-it note, used in real life, the user can generate post-it data at a desirable position.

In the exemplary embodiment, the terminal device 100 and the external device use the same post-it program or a compatible post-it program to provide the post-it function.

After executing the post-it program by the terminal device 100, the user may generate new post-it data or retrieve previously generated post-it data. As a result, the newly generated post-it data or the retrieved previous post-it data is displayed on a display screen (30) of the terminal device 100 as shown in FIG. 4A.

FIG. 4B illustrates post-it data displayed on a display screen (40) of the external device which will perform a data transceiving operation with the terminal device 100.

If the terminal device 100 and the external device execute the post-it program, and if the user shakes the terminal device 100 and the external device with his/her hand, the post-it data is exchanged between the terminal device 100 and the external device.

FIG. 4C illustrates a display screen (31) after the post-it data has been exchanged between the terminal device 100 and the external device. Referring to the display screen (31), the post-it data displayed on the display screen (30) of the terminal device 100 of FIG. 4A and the post-it data displayed on the display screen (40) of the external device of FIG. 4B are all displayed on display screen (31). The display screen (31) of FIG. 4C is displayed on both devices, on the terminal device 100 and on the external device.

In FIGS. 4A and 4B, each post-it data is placed at a different position and the post-it data may be overlapping on the displays of the two devices which will perform the data transceiving operation. In this case, the terminal device 100 and the external device adjust the position of the overlapping post-it data so that the post-it data are placed apart from each other and adjacently.

FIG. 5 is a flowchart illustrating a method for transceiving data according to an exemplary embodiment of the present invention.

The control unit 160 of the terminal device 100 compares the momentum of the terminal device 100 or a variation in the momentum with the momentum of the external device or a variation in the momentum to determine, whether to perform a data transceiving operation. In this exemplary embodiment, a method for transceiving data determines whether to perform a data transceiving operation by comparing the momentums of the two devices.

The control unit 160 of the terminal device 100 controls the interface unit 150 to activate a connection via the network 200 with external devices located within a communicable range (S300).

The sensing unit 110 senses the momentum of the terminal device 100 in real time and normalizes the momentum sensed by the sensing unit 110 through the filtering unit 120. Through such operations, a plurality of momentums is output (S310).

The interface unit 150 receives the momentums from all of the external devices connected to the network 200 (S320).

The control unit 160 compares the momentum sensed by the sensing unit 110 with the momentums of the external devices received through the interface unit 150 to determine whether there is a variation in the two momentums (S330).

If it is determined that there is a variation in the two momentums (S330-Y), the two momentums are compared to calculate a comparison value (S340). Thereafter, the control unit 160 determines whether the calculated comparison value falls within a first error range (S350).

If it is determined that the comparison value falls within the first error range (S350-Y), the control unit 160 controls the interface unit 150 to perform a data transceiving operation between a specific folder of the terminal device 100 and a specific folder of the external device.

If it is determined that the comparison value exceeds the first error range (S350-N), the control unit 160 does not perform the data transceiving operation. This is because if motions are performed by the terminal device 100 and by the external device, but the comparison value of the two momentums exceeds the first error range, the terminal device 100 and the external device are not determined to have the same momentum.

The operations S310 to S330 are repeated as long as the terminal device 100 is connected to the network 200.

FIG. 6 is a flowchart illustrating a method for transceiving data according to another exemplary embodiment of the present invention.

The control unit 160 of the terminal device 100 compares a variation in the momentums of the terminal device 100 with a variation of the momentums of the external device to determine whether to perform the data transceiving operation. In other words, in the other exemplary embodiment of the present invention, a method for transceiving data, which determines whether to perform a data transceiving operation by comparing two variations in the momentums of the two devices is described.

The control unit 160 of the terminal device 100 controls the interface unit 150 to activate connection via the network 200 with the external devices which are located in a communicable range (S400).

The sensing unit 110 senses the momentum of the terminal device 100 in real time and normalizes the momentum sensed by the sensing unit 110 through the filtering unit 120. Through such operations, a plurality of momentums is output (S410).

The control unit 160 calculates a variation in the momentums of the terminal device by comparing a previous momentum and a current momentum among the plurality of momentums which are output by the filtering unit 120 in the order measured, and stores the variation in the storage unit 130 (S420).

The interface unit 150 receives a variation in the momentums received from all of the external devices connected to the network 200 (S430). The variations in the momentums received from the external devices may be temporarily stored in the storage unit 130.

The control unit 160 compares the variation in the momentums of the terminal device 100 with the variation in the momentums of the external device to determine whether there is a difference between the two variations (S440).

If it is determined that there is a difference between the two variations (S440-Y), a comparison value of the two variations is calculated (S450) and it is determined whether the calculated comparison value falls within a second error range (S460).

If it is determined that the comparison value falls within the second error rage (S460-Y), the control unit 160 controls the interface unit 150 to perform a data transceiving operation between a specific folder of the terminal device 100 and a specific folder of the external device (S470).

If it is determined that the comparison value does not fall within the second error range (S460-N), the control unit 160 does not perform the data transceiving operation.

If motions are generated in a stationary terminal device 100 and in a stationary external device resulting in a variation in the momentums, and if it is determined that the terminal device 100 and the external device have the same momentum, the control unit 160 performs data transceiving operation through the network 200.

Accordingly, the terminal device 100 and the external device can exchange data with each other by the user's motion of shaking the terminal device 100 and the external device with his/her hand, without having to connect the external device 100 and the external device via a cable.

The present invention illustrates that the same momentum is generated by shaking the two or more devices of the plurality of terminal devices located in a communicable range, which wish to exchange data.

As a variant, the same momentum can be generated when two users shake hands with each other for a predetermined time with their respective device being held in their hands. In this case, data transceiving operation is performed between the devices of the two users. This can be applied to situations in which electronic name cards or phone numbers are exchanged.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A device comprising:
a sensor configured to sense a movement of the device;
an interface configured to receive information related to a movement of an external device located within a communicable range of the device: and
a controller configured to determine a similarity between the movement and the movement of the external device based on the received information, and control the interface to transmit a data, which is stored in the device and does not exist in the external device, to the external device in response to the determined similarity being within a pre-defined error range.

2. The device as claimed in claim 1, wherein the controller is further configured to transmit the sensed movement of the device to the external device, and in response to receiving data from the external device, activate operation of the device based on the received data.

3. The device as claimed in claim 1, wherein the sensor is configured to sense the movement of the device in real time and to output the movement of the device.

4. The device as claimed in claim 3, wherein the controller is further configured to, in response to receiving a variation in the movement of the external device measured in real time from the external device, determine a similarity between the movement of the device and the movement of the external device based on a variation calculated from the movement of the device sensed in real time and the received variation in the movement of the external device.

5. The device as claimed in claim 4, wherein the controller is further configured to compare the calculated variation and the received variation, and in response to the calculated comparison value falling within a pre-set error range, control the interface to transmit the data for activating the external device to the external device.

6. The device as claimed in claim 1, wherein the data controls at least one of activating an application program and activating an execution program.

7. A data communication method of a device, the method comprising:
sensing a movement of the device;
in response to receiving information related to a movement of an external device located within a range communicable with the device from the external device, determining a similarity between the movement of the device and the movement of the external device based on the received information; and transmitting a data, which is stored in the device and does not exist in the external device, to the external device in response to the determined similarity being within a pre-defined error range.

8. The data communication method as claimed in claim 7, further comprising: transmitting the sensed movement of the device to the external device; and in response to receiving data from the external device, activating operation of the device based on the received data.

9. The data communication method as claimed in claim 7, wherein the sensing comprises detecting a movement of the device in real time.

10. The data communication method as claimed in claim 9, further comprising, in response to receiving a variation in the movement of the external device measured in real time from the external device, determining a similarity between the movement of the device and the movement of the external device based on a variation calculated from the movement of the device sensed in real time and the received variation in the movement of the external device.

11. The data communication method as claimed in claim 10, further comprising comparing the calculated variation and the received variation, and in response to the calculated comparison value falling within a pre-set error range, transmitting the data for activating the external device to the external device.

12. The data communication method as claimed in claim 7, wherein the data controls at least one of activating an application program and activating an execution program.

* * * * *